United States Patent [19]

Baracchi et al.

[11] Patent Number: 5,308,559
[45] Date of Patent: May 3, 1994

[54] METHOD FOR MANUFACTURING AN AIR FILTER

[75] Inventors: Fabrizio Baracchi, Turin; Silvano Casalicchio, Bruino; Mauro Gallino, Grugliasco; Luigi Tarditi, Pinerolo, all of Italy

[73] Assignee: Gilardini S.p.A., Turin, Italy

[21] Appl. No.: 795,316

[22] Filed: Nov. 20, 1991

[30] Foreign Application Priority Data

Nov. 20, 1990 [IT] Italy ............... 67905 A/90

[51] Int. Cl.⁵ ............................................. B29C 67/22
[52] U.S. Cl. ............................ 264/46.4; 264/252; 264/328.7; 264/DIG. 48
[58] Field of Search ............ 264/46.4, 259, 252, 264/DIG. 48, 328.7

[56] References Cited

U.S. PATENT DOCUMENTS

| | | | |
|---|---|---|---|
| 3,183,285 | 5/1965 | Boylan | 264/DIG. 48 |
| 3,865,919 | 2/1975 | Pall et al. | 264/259 |
| 4,438,057 | 3/1984 | Sundseth | 264/46.5 |
| 4,569,813 | 2/1986 | Taki et al. | 264/259 |
| 4,882,055 | 11/1989 | Stamstad | 210/483 |
| 4,957,672 | 9/1990 | Carter et al. | 264/46.4 |
| 5,030,263 | 7/1991 | Kemp | 55/477 |
| 5,062,874 | 11/1991 | Legare et al. | 55/337 |

*Primary Examiner*—Allan R. Kuhns
*Attorney, Agent, or Firm*—Reed Smith Shaw & McClay

[57] ABSTRACT

A method for manufacturing an air filter consists of building in two stages around a paper filtering element previously prepared, an edge made of flexible foam, first injecting resin into a separate space from the filtering element, and then letting it expand until it anchors to it.

An apparatus to carry out such method consists of a die in which the filtering element is inserted, around which a channel is formed where a mobile frame is sinked, whose shape corresponds to the filtering element one, in such a way as to define an injection recess separated from the filtering element, and an expansion recess adjacent to the filtering element, connected by the mobile frame lift, so that the resin can expand and anchor to the filtering element.

1 Claim, 3 Drawing Sheets

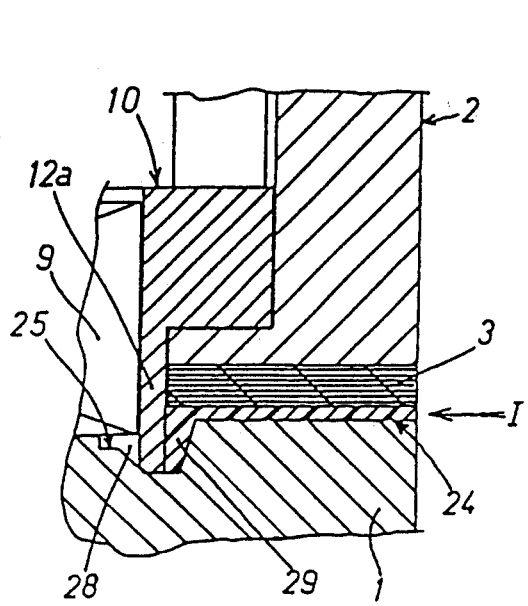
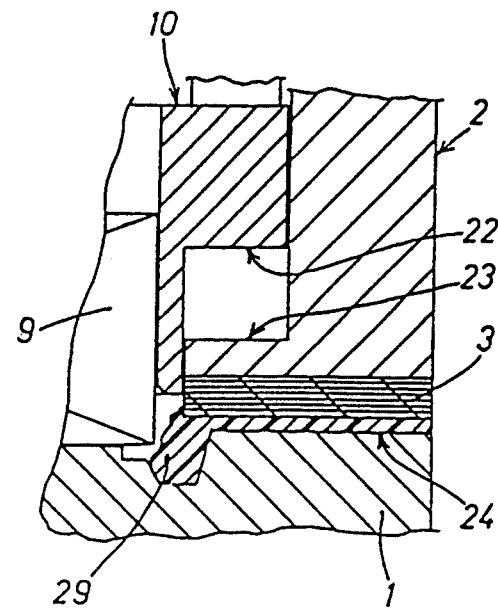
FIG. 2a    FIG. 2b
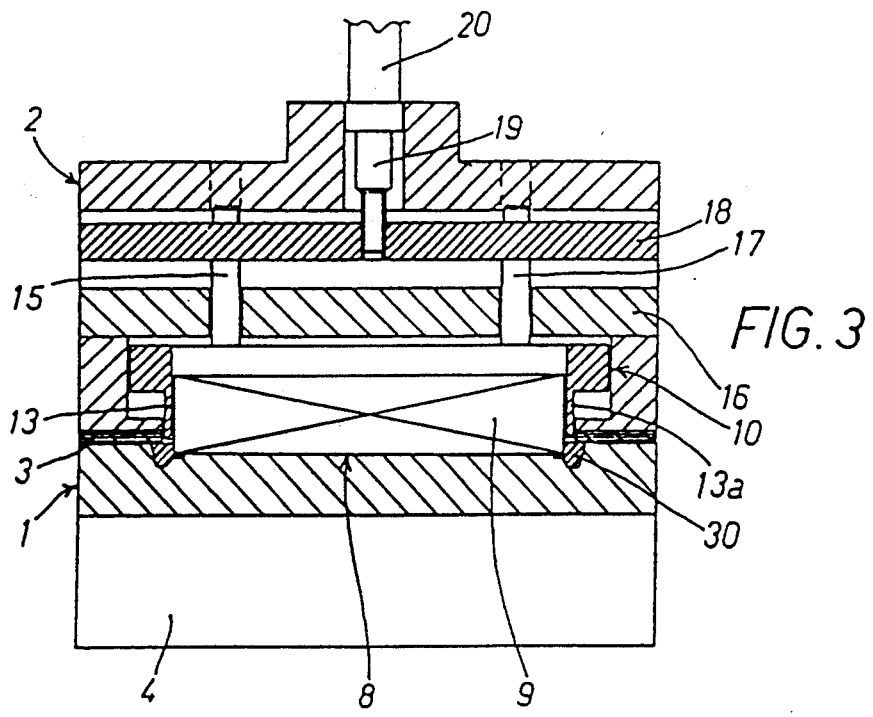
FIG. 3

METHOD FOR MANUFACTURING AN AIR FILTER

BACKGROUND OF THE INVENTION

1. Field of the Invention

The present invention refers to a method for manufacturing an air filter, to the filter thus obtained and to the apparatus to carry out such method.

2. Background Information

An air filter, particularly for vehicle engines, is usually composed of a filtering element made of pleated paper, shaped as a parallelepiped or a cylinder, to which a perimetral edge is adhered, made of foamed resin, usually polyurethane (PU) or polyvinylchloride (PVC). The foamed resin is generally in the form of flexible foam that fixes shape and dimensions of the filtering element, and simultaneously works as seal gasket when the filter is assembled in its vessel, on board of the vehicle.

The foamed resin edge is usually obtained by placing the paper, adequately pleated, into a die, and then injecting or casting the resin into a die recess running all around the paper. The resin at plastic state sticks to the paper generating an edge that copies the die recess shape.

The employment of this technique, however, provides different kinds of problems. One of these problems is created by the possible nonuniform distribution of the resin along the die recess, particularly in the part that is far away from the injection point. Another problem can be the excessive penetration of the resin into the filtering paper, due to the low resistance opposed by it to the melted resin flow that enters the above-said recess under pressure, during injection.

In the German Patent nr. 2.162.355, a die equipped with side plates is proposed to be used, where such plates limit the contact area between paper element and injected resin, to avoid that the latter migrates on the paper and impregnates its pores. However, though the contact area is reduced, a direct interface is always present between filtering paper and injected resin, so that the chance of migration of the resin through the paper cannot be excluded.

SUMMARY OF THE INVENTION

The present invention aims to eliminate or reduce the above-said inconveniences of the known manufacturing methods for paper filters with resin edges, providing a method that allows to make the resin distribution regular into the die recess and to prevent its migration into the filtering paper.

Another purpose of the invention is to provide an apparatus to automatically carry out the above-said method, in order to allow a high productivity in the manufacture of air filters for vehicle engines.

The above-said and other purposes and advantages of the invention, such as the ones resulting from the following description, are reached with a method for manufacturing an air filter, including a preparation stage for a filtering element in pleated paper and a stage to form an edge made of synthetic resin around said filtering element, wherein said stage to form said edge made of synthetic resin is obtained in two sub-stages, first inserting the resin at plastic state into a restrained space outside contact with said filtering element but next to it, until said space is regularly filled, and then connecting said space with the paper filtering element and letting the resin expand until the contact with it and the anchorage to it.

Another object of the invention is composed of an apparatus to manufacture an air filter, including a die in which a perimetral edge made of synthetic resin is formed by injection on a paper filtering element placed inside said die, wherein a mobile frame with parallel walls that are contiguous to the paper filtering element sides is contained in said die, said frame being prone to assume a contact position against the bottom of said die, next to which an injection recess is defined for said synthetic resin, spaced and separated from said filtering element, and an expansion recess, internally delimited by said filtering element; and a disconnection position from the bottom of said die, next to which said injection and expansion recesses are a single recess that extends up to said paper filtering element, so that the resin can reach by expansion said paper filtering element and anchor to it.

The invention also relates to the filter obtained with the above-said method.

A preferred embodiment of the invention will now be described, given as an illustrating and not limiting example, with reference to the accompanying drawings.

BRIEF DESCRIPTION OF THE DRAWINGS

FIG. 2a is an enlarged sectional view of a part in FIG. 2, during injection;

FIG. 2b is a view corresponding to the one in FIG. 2a, during expansion;

FIG. 3 is a sectional view along line III—III in FIG. 2, in another operative position;

DESCRIPTION OF THE PREFERRED EMBODIMENTS

Figure 1:
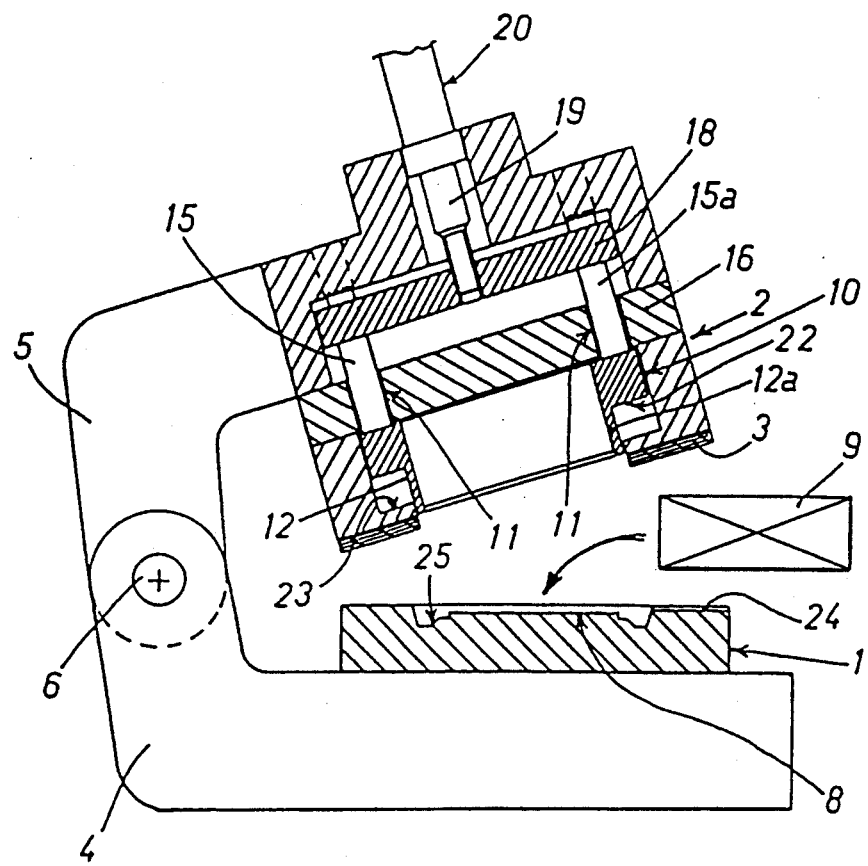
FIG. 1 is a partially sectional view of the apparatus according to the invention with open die.
Figure 2:
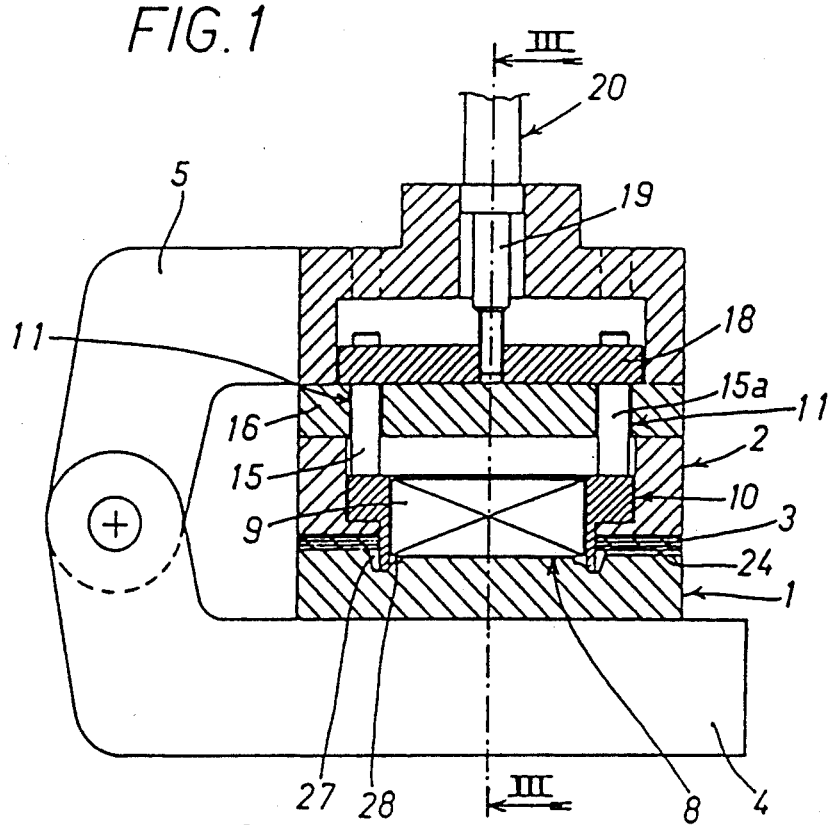
FIG. 2 is a partially sectional view of the apparatus in FIG. 1, with closed die, in the injection position.
Figure 3A:
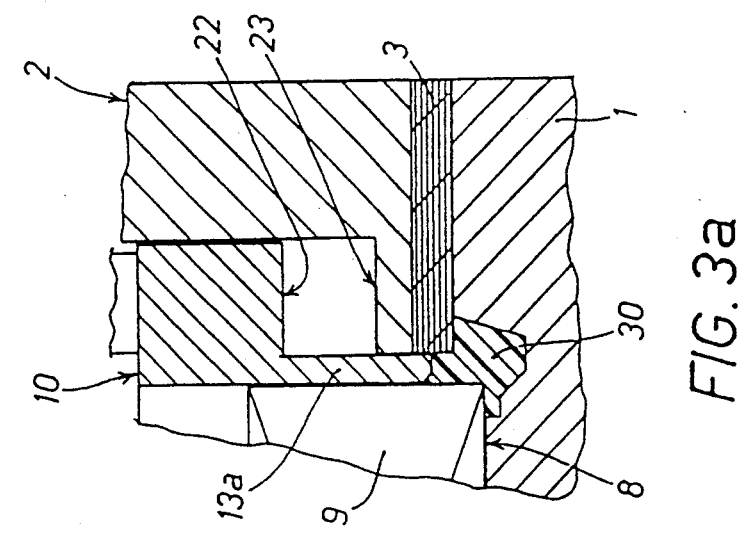
FIG. 3a is an enlarged sectional view of a part in FIG. 3.

With reference to FIG. 1, the apparatus according to the invention includes a die composed of a lower die 1 and an upper die 2, equipped with a gasket 3 on its lower side aimed to press closed against the lower die 1. The two dies 1 and 2 are rotatingly constrained one another through their respective arms 4 and 5 with fulcrum on the pin 6. FIG. 1 shows the open die, while FIG. 2 shows the closed die. The central plane 8 of the lower die 1 is realized of such shape and dimension as to be able to house a paper filtering element 9, produced apart in a known way. In case of air filters for vehicle engines, the filtering element has the shape of a cylinder or a parallelepiped. In the shown case, the filtering element 9 is a parallelepiped in shape. Inside the die 2 a structure is contained, essentially composed of a quadrangular frame 10, whose hollow interior has shape and dimensions corresponding to those of the filtering element 9, and is therefore such as to surround and keep in position on the plane 8 the filtering element during working, as will be said afterwards. With reference also to FIGS. 2 and 3, the frame 10 consists of four orthogonal walls 12, 12a, 13, 13a, rigidly connected one another, and upper connected to four columns 15, 15a, 17, 17a (this one cannot be seen in the figure), that are suitable to slide in holes 11 provided in a driving plate 16 of the upper die, and are then secured to plate 18, parallel to plate 16. The plate 18 is in turn connected to the piston 19 of an actuator cylinder 20, only partially shown. In the retracted position of the piston in the cylinder, shown in FIGS. 1, 2b, 3, 3a, the frame 10 is lifted as regards the lower die 1, but, with closed die, surrounds the filtering element 9 and keeps it centered on the bearing plane 8 of the lower die 1. In the extended position of the piston 19, shown in FIG. 2, the frame 10 is seated against the die 1, and in this position the plate 18 seats against the driving plate 16. The piston 19 stroke is adjusted in such a way as to realize this bedding and disconnection movement of the frame 10 against the die 1. For this purpose, the frame 10 is formed with a continuous shoulder 22 suitable to seat against the stop surface 23 of the upper die 2.

Around the bearing plane 8 of the lower die 1, a channel 25 is defined whose profile generates the section of the edge made of flexible foam of foamed resin that must be formed around the filtering element 9. The frame 10 seats while closing, inside such very channel, defining, in the radially external part of the channel 25, an injection recess 27, separated and insulated from the filtering element 9, and, in the radially internal side of the channel 25, an expansion recess 28, internally delimited by the filtering element 9 (FIG. 2). This latter one preferably extends till below a part of the filtering element, in order to allow a better anchorage of the resin. This is shown in detail in the part of FIG. 2a.

The recess 27, more external, communicates with an injection channel 24, through which the melted resin is injected into the die.

The operation of the described apparatus is the following one. With open die (FIG. 1), a filtering element 9, previously prepared, is placed on plane 8 of the lower die. After that, the die is closed and the frame 10 is seated against the lower die 1. The walls 12, 12a, 13, 13a settle in a radially intermediate position inside channel 25, so that the injection recess 27 and the expansion recess 28 (FIG. 2) are defined. The melted resin 29 is injected into the recess 27, as indicated by arrow 1 in FIG. 2a. The resin 29 is regularly and homogeneously distributed along the whole recess, completely filling it. After a time varying depending on the properties of the used resin, on the recess geometry and on other operating factors, the frame 10 is lifted and the resin is allowed to expand through the expansion recess 28, now communicating with the recess 27, till the filtering element 9 is reached, to which the resin adheres and anchors.

The expansion of resin 29 towards the filtering element 9 is shown in the part of FIG. 2b. It is evident that the resin anchorage to the filter paper only occurs under the thrust determined by the expansion, and not owing to the much stronger thrust generated by the injection pressure, as well known in the technique. Therefore, a deep penetration of the melted resin does not occur into the paper filtering element, that would produce an excessive impregnation of it, with following decrease of the filtering surface and capacity.

After having ended the expansion and cooled the resin, the complete on-board filter 30 is produced with flexible foam of foamed resin, like in FIG. 3 and in the part in FIG. 3b. At that time, the die is opened, the filter is removed, another paper filtering element is placed into the die and the described cycle is repeated.

Figure 4:
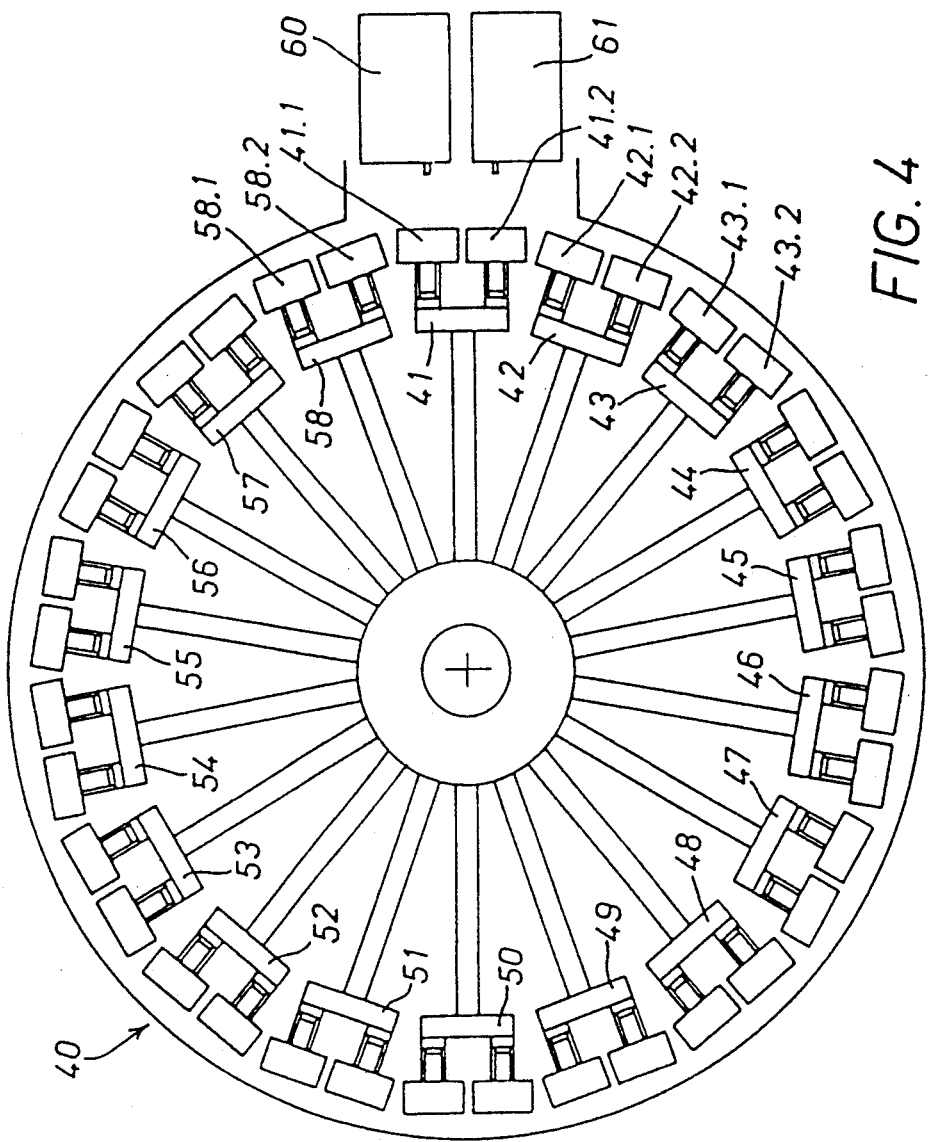
FIG. 4 is a schematic plan view of a machine to manufacture filters including the apparatus according to the invention.

FIG. 4 shows a machine for the volume production of the filter using the above described apparatus.

The machine consists of a carrousel carrying 18 work stations progressively numbered from 41 to 58, each comprising two molding apparatus of the above described type, for a total of 36 apparatus. Every apparatus is marked by numbers 41.1 and 41.2, 42.1 and 42.2, 43.1 and 43.2 ... 58.1 and 58.2. Each one of the single molding apparatus can produce only one filter, like in the embodiment described by the previous Figures, or can produce more filters, for example when their dimensions are small. In this case, the lower die will be formed with a channel that surrounds every bearing plane of every filtering element, and all the channels will communicate with the injection channel. Also the mobile frame that limits the injection recess will be a multiple one, with such shape and dimensions as to allow the production of more filters within a single molding operation.

Next to the carrousel 40, a double injection unit is placed, composed of two injectors 60 and 61, aligned from time to time with each device in each work station 41 ... 58 of the carrousel 40. The injection unit is sided by the stocking tanks for raw materials and additives, in a known way, and therefore not shown. For every carrousel 40 turn of a 20° angle, the injection unit is aligned with a work station. In this alignment condition, the injectors are pushed against the apparatus of each work station—with an automatism known to any experienced person in the field—and at the same time the resin injection occurs into each one of the two apparatus composing every single work station. In the meantime, the finished filter is unloaded from the previous stations and the paper filtering element is loaded into the following ones, realizing a volume production with high productivity.

The described method and apparatus are particularly advantageous to produce air filters for vehicle engines, though their use is possible also to produce air filters suitable for other uses.

A preferred embodiment of the invention has been described, but obviously it is prone to several modifications and variations within the same inventive idea.

We claim:
1. A method for manufacturing an air filter for vehicle engines, comprising the steps of:
    preparing a filtering element of pleated paper and positioning said filtering element in a mold having a cavity such that said filtering element abuts an expansion recess portion of said cavity;
    forming an edge made of synthetic resin around said filtering element, wherein the forming step comprises the substeps of first injecting said resin in a plastic state into an injection recess portion of said cavity, the resin in said injection recess initially not being in contact with said filtering element by virtue of the positioning of a movable mold element which separates the injection recess from the expansion recess; and
    then connecting the injection recess with the expansion recess by moving said movable mold element, thereby allowing said resin to expand until said resin contacts and adheres to said filtering element.

* * * * *